United States Patent
Xu et al.

(10) Patent No.: US 11,265,773 B2
(45) Date of Patent: Mar. 1, 2022

(54) CELL RE-SELECTION WHILE INACTIVE

(71) Applicant: Apple Inc., Cupertino, CA (US)

(72) Inventors: Fangli Xu, Beijing (CN); Yuqin Chen, Beijing (CN); Haijing Hu, Los Gatos, CA (US); Dawei Zhang, Saratoga, CA (US); Murtaza A. Shikari, Mountain View, CA (US); Sethuraman Gurumoorthy, San Jose, CA (US); Xu Ou, San Jose, CA (US); Srinivasan Nimmala, San Jose, CA (US); Sree Ram Kodali, San Jose, CA (US); Longda Xing, San Jose, CA (US); Srirang A. Lovlekar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/960,855

(22) PCT Filed: Jan. 11, 2018

(86) PCT No.: PCT/CN2018/072249
§ 371 (c)(1),
(2) Date: Jul. 8, 2020

(87) PCT Pub. No.: WO2019/136664
PCT Pub. Date: Jul. 18, 2019

(65) Prior Publication Data
US 2021/0068010 A1    Mar. 4, 2021

(51) Int. Cl.
*H04W 4/00* (2018.01)
*H04W 36/00* (2009.01)
(Continued)

(52) U.S. Cl.
CPC ....... *H04W 36/0061* (2013.01); *H04W 36/24* (2013.01); *H04W 76/27* (2018.02)

(58) Field of Classification Search
CPC ............ H04W 36/0061; H04W 36/24; H04W 76/27; H04W 48/12; H04W 48/20
(Continued)

(56) References Cited

U.S. PATENT DOCUMENTS

2018/0098222 A1* 4/2018 Ku ........................ H04W 16/08

FOREIGN PATENT DOCUMENTS

WO    2014/067119 A1    8/2014

OTHER PUBLICATIONS

Huawei, Hisilicon Cell reselection for inactive UEs, R2-1710585, 3GPP TSG-RAN WG2#99bis Meeting 13, Sections 1-3; Oct. 13, 2017.
(Continued)

*Primary Examiner* — Marcos Batista
(74) *Attorney, Agent, or Firm* — Kowert, Hood, Munyon, Rankin & Goetzel, P.C.

(57) ABSTRACT

This disclosure relates to performing cell re-selection while in an inactive state in a cellular communication system. A wireless device may establish a radio resource control connection with a cellular base station. The wireless device may receive an indication to enter a radio resource control inactive state. The wireless device may perform cell re-selection while in the radio resource control inactive state. Cells that are in the current radio access network notification area of the wireless device may be prioritized over cells that are not in the current radio access network notification area of the wireless device when performing cell re-selection while in the radio resource control inactive state.

20 Claims, 6 Drawing Sheets

(51) Int. Cl.
    *H04W 76/27* (2018.01)
    *H04W 36/24* (2009.01)
(58) Field of Classification Search
    USPC .......................................... 370/331; 455/312
    See application file for complete search history.

(56) References Cited

OTHER PUBLICATIONS

ITRI Cell reselection for inactive UE R2-1713572, #GPP TSG TAN WG2 #100, Section 3, Dec. 1, 2017.
International Search Report and Written Opinion, Application No. PCT/CN2018/072249, dated Sep. 25, 2018, 9 pages.
International Preliminary Report on Patentability, Application No. PCT/CN2018/072249, dated Mar. 27, 2020, 18 pages.
Extended European Search Report for EP18899090.7, dated Jul. 28, 2021.
Huawei et al. "Cell reselection for inactive UEs"; 3GPP TSG-RAN WG2#100 Meeting R2-1712575; Reno, US; Nov. 27-Dec. 1, 2017; 4 pages.
Apple Inc. "Cell reselection in Inactive state"; 3GPP TSG-RAN WG2 Meeting #101 R2-1802416; Athens Greece; Feb. 26-Mar. 2, 2018; 4 pages.
"3rd Generation Partnership Project; Technical Specification Group Radio Access Network; NR;NR and NG-RAN Overall Description; Stage 2 (Release 15)"; 3GPP TS 38.300 v15.0.0; Valbonne, France; Dec. 2017; 68 pages.

* cited by examiner

CELL RE-SELECTION WHILE INACTIVE

PRIORITY INFORMATION

This application is a national phase filing of Patent Cooperation Treaty (PCT) Application No. PCT/CN2018/072249, entitled "Cell Re-Selection while Inactive" and filed Jan. 11, 2018, which is incorporated by reference in its entirety as though fully and completely set forth herein.

FIELD

The present application relates to wireless communications, and more particularly to systems, apparatuses, and methods for performing cell re-selection while in an inactive state in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for performing cell re-selection while in an inactive state in a cellular communication system.

According to the techniques described herein, a wireless device may preferentially re-select to cells within the current radio access network notification area (RNA) of a wireless device when performing cell re-selection while operating in a radio resource control (RRC) inactive mode.

Prioritizing cells within the current RNA of a wireless device may be accomplished in any of a variety of ways. Among possible techniques, it may be possible to set the frequency and/or cell priority of frequencies/cells associated with the current RNA as having high priority with respect to cell re-selection. This may impact the triggering condition(s) under which such cells are considered for cell re-selection, which may increase the likelihood that such a cell is chosen for re-selection.

As another possibility, one or more offsets (e.g., based on a frequency and/or a cell being associated with the current RNA of a wireless device) may be applied when ranking potential cells for re-selection. This may bias the ranking process, e.g., to improve the relative rankings of cells that are within the current RNA of the wireless device, which may increase the likelihood that such a cell is chosen for re-selection.

As a still further possibility, a wireless device may check, after choosing a cell to re-select to, whether the chosen cell is in the current RNA of the wireless device. If the chosen cell is in the current RNA of the wireless device, the wireless device may proceed to re-select to the chosen cell. However, if the chosen cell is not in the current RNA of the wireless device, and there is another cell that the wireless device determines is suitable for re-selection that is in the current RNA of the wireless device, the wireless device may instead re-select to the suitable cell that is in the current RNA of the wireless device.

Such techniques may be used individually or in any combination, as desired. A wireless device that implements such techniques may, at least in some instances, reduce the number of RNA updates performed by the wireless device, which may be of benefit to the wireless device and the cellular network with which the wireless device is in communication.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
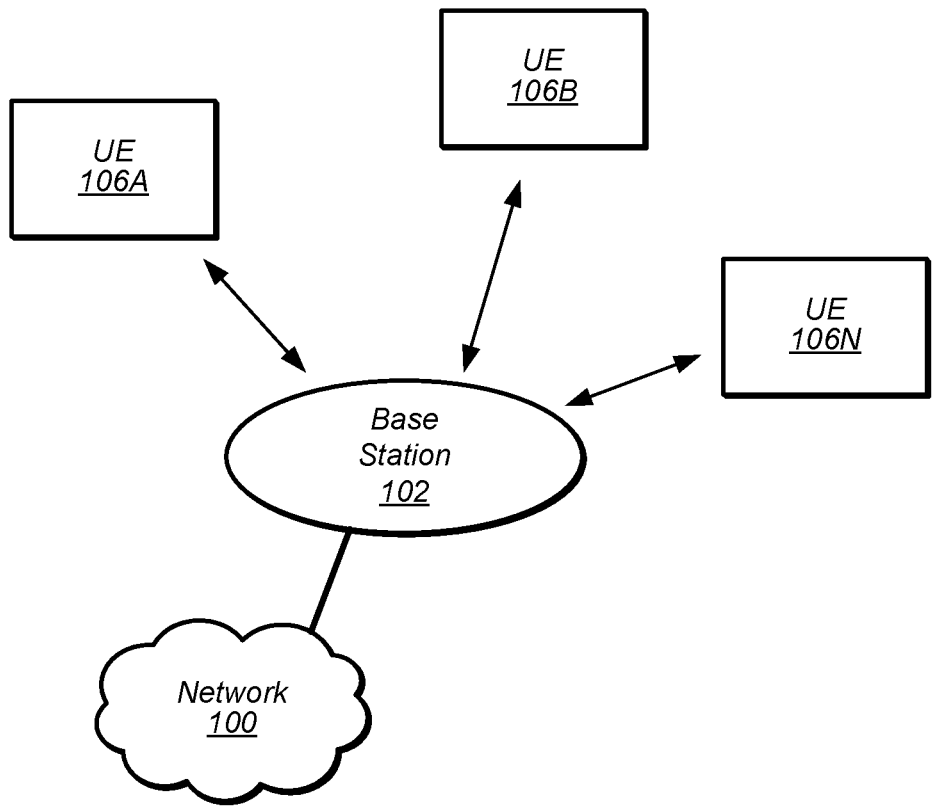
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
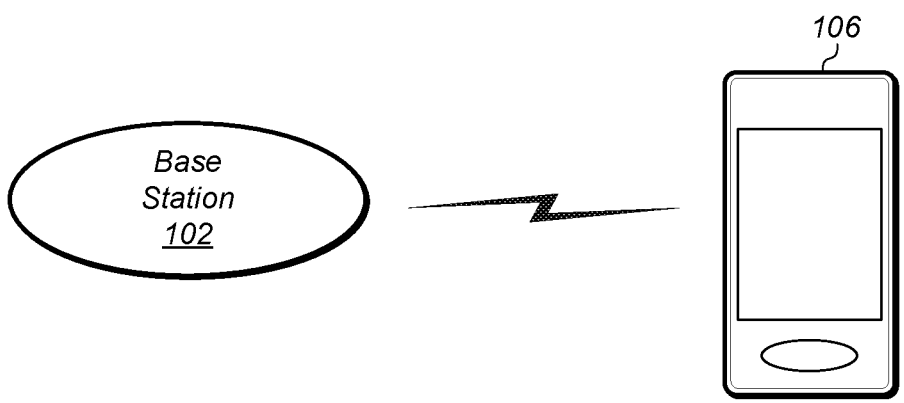
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform cellular communication using modular control channel formats for uplink control information, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM), and separate radios for communicating using each of Wi-Fi and BLUETOOTH™. Other configurations are also possible.

Figure 3:
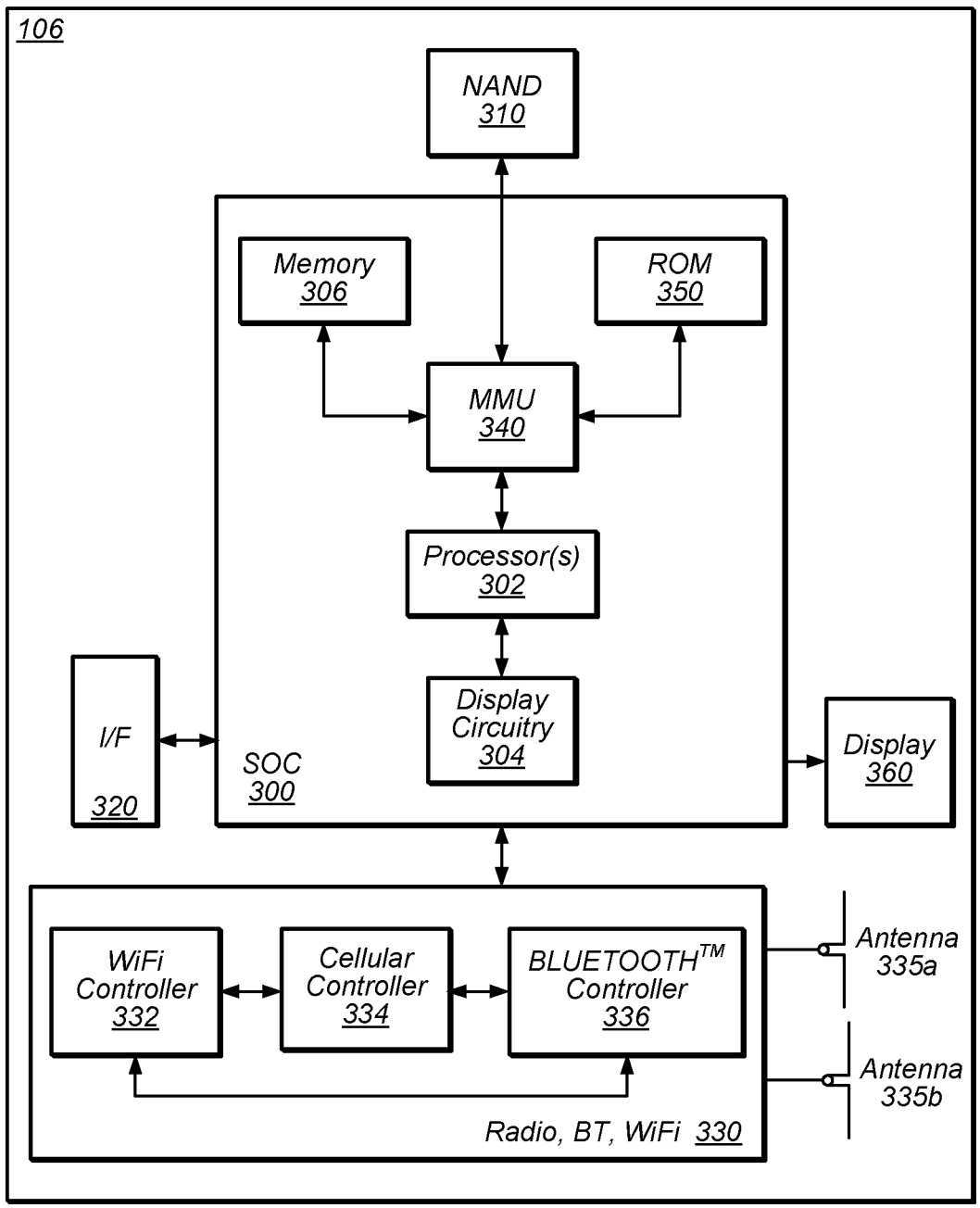
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform cell re-selection while in an inactive state in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform cell re-selection while in an inactive state in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH™ controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
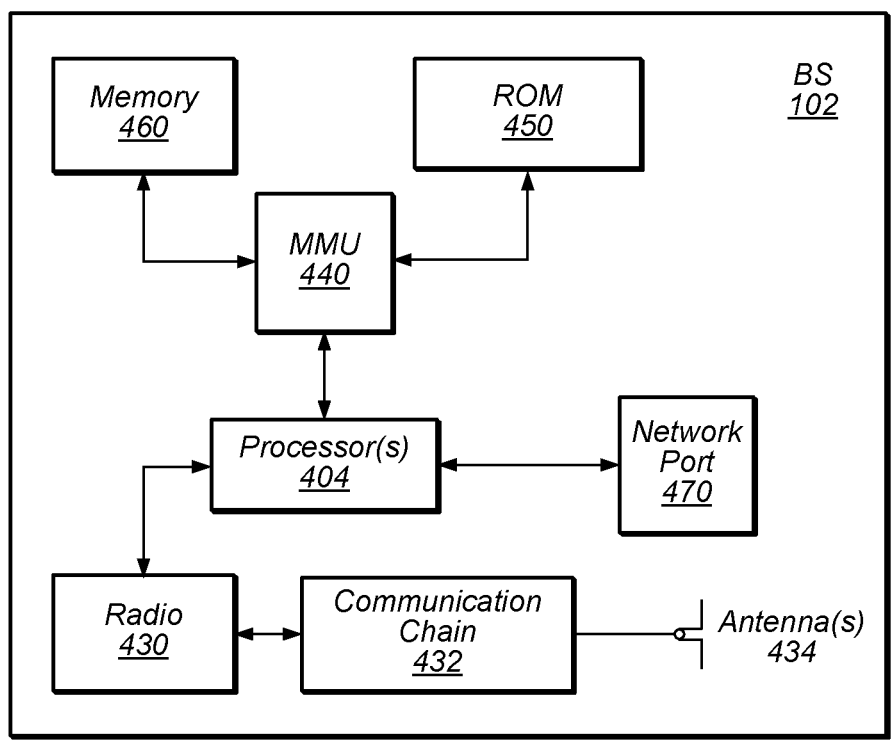
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to perform cell re-selection while in an inactive state in a cellular communication system.

Figure 5:
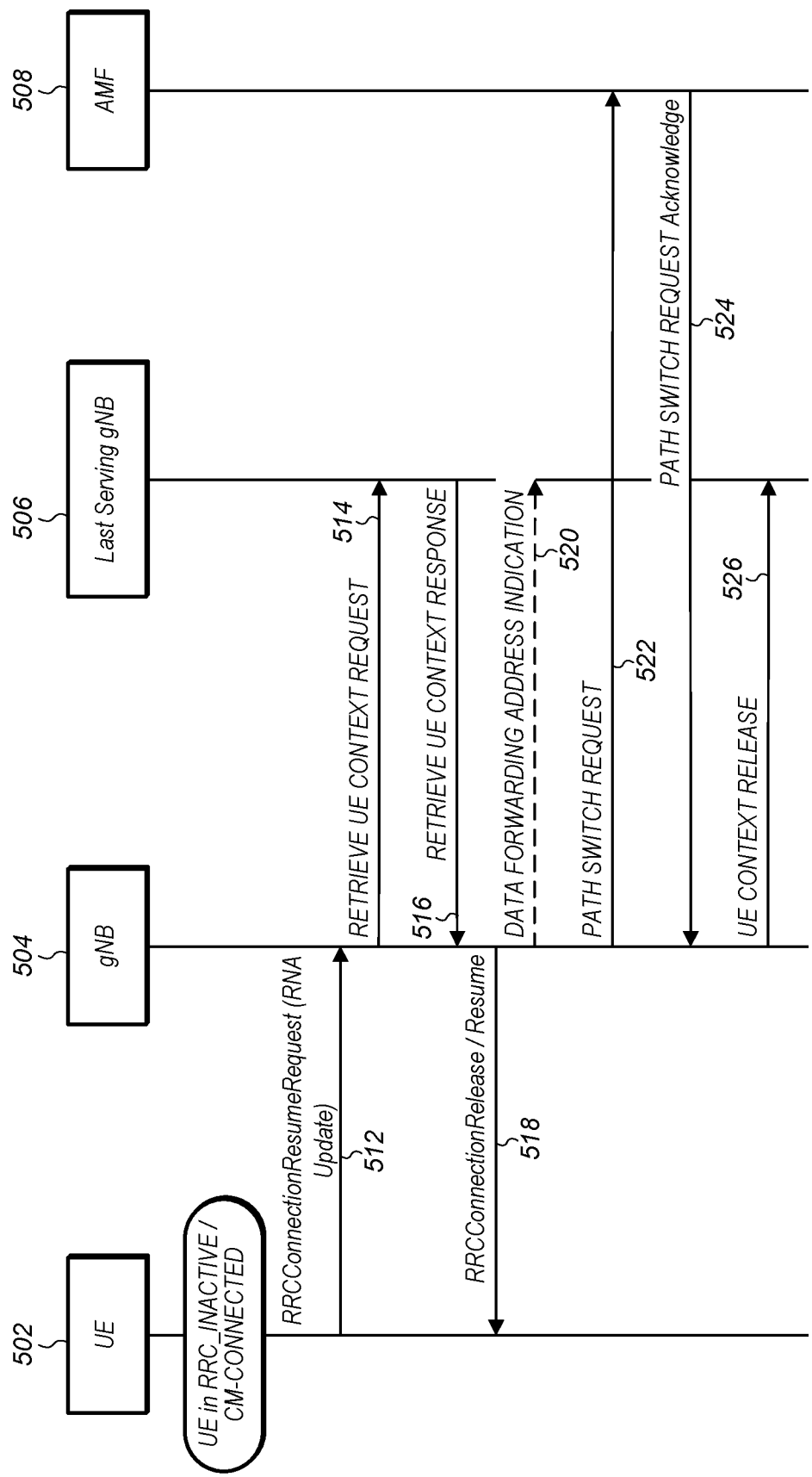
FIG. 5 is a signaling flow diagram illustrating an exemplary possible signal flow for performing a RNA update procedure, according to some embodiments.
Figure 6:
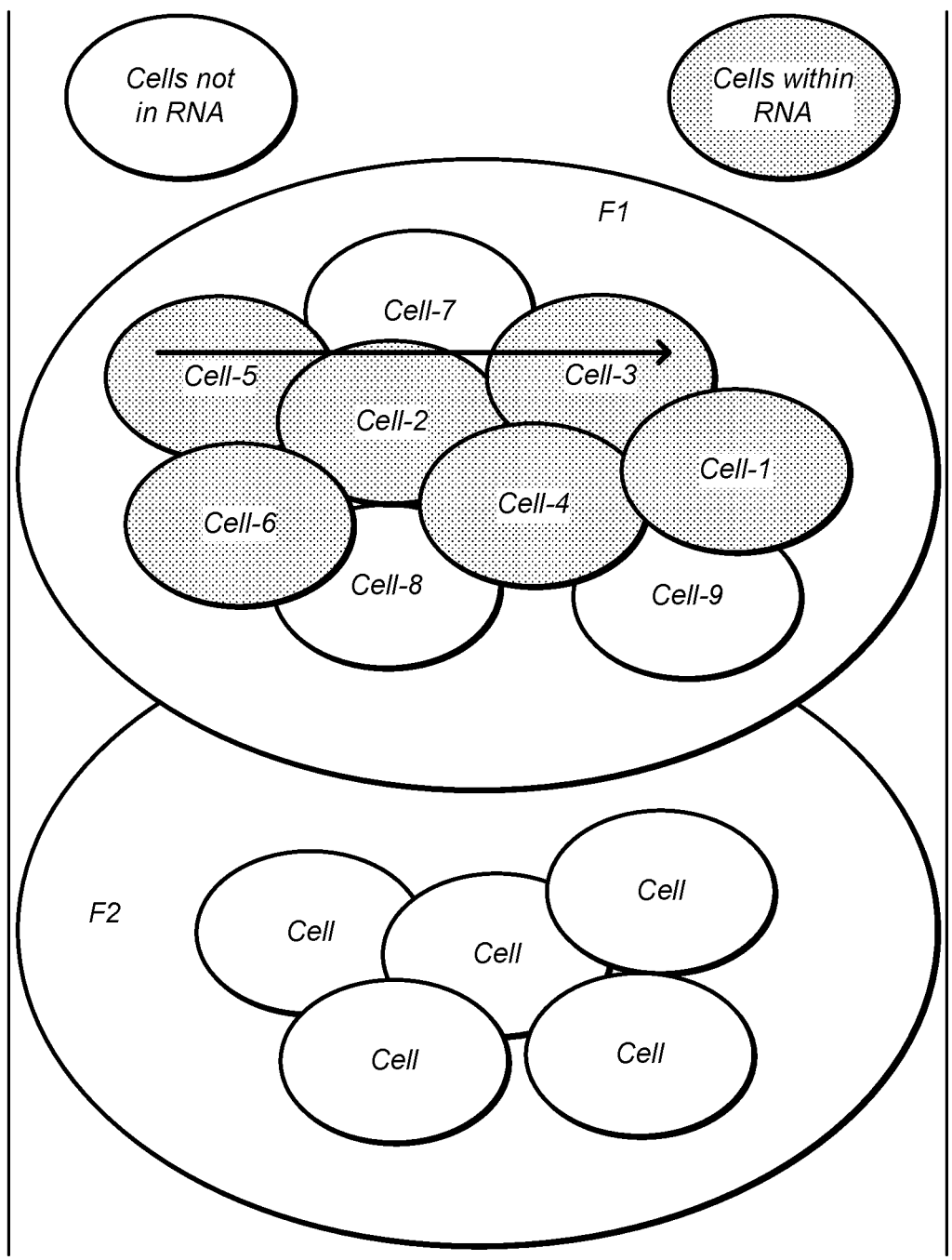
FIG. 6 illustrates aspects of an exemplary possible cell re-selection scenario for a wireless device in an inactive state, according to some embodiments.
Figure 7:
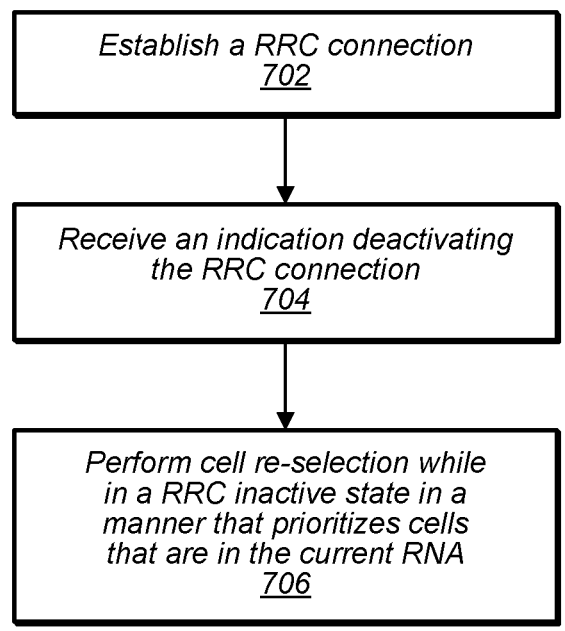
FIG. 7 is a flowchart diagram illustrating an exemplary possible method for performing cell re-selection while in an inactive state in a cellular communication system, according to some embodiments.

FIGS. 5-7—Cell Re-Selection While in an Inactive State

Multiple cellular communication technologies include the use of a radio resource control (RRC) protocol, e.g., which may facilitate connection establishment and release, radio bearer establishment, reconfiguration, and release, and/or various other possible signaling functions supporting the air interface between a wireless device and a cellular base station.

A wireless device may commonly operate in one of multiple possible states with respect to RRC. For example, in LTE, a wireless device may operate in a RRC connected state (e.g., in which the wireless device can perform continuous data transfer, and in which handover between cells is managed by the network and access stratum context information is retained for the wireless device), or in a RRC idle state (e.g., in which the wireless device may operate in a more battery efficient state when not performing continuous data transfer, in which the wireless device may handle it's cell re-selection activities, and in which the network may not retain access stratum context information for the wireless device).

In addition to RRC connected and RRC idle states, it may also be possible to support one or more other types of RRC states for a wireless device, at least according to some embodiments. For example, for NR, a RRC inactive state in which a wireless device may be able to operate in a relatively battery efficient state while the network also retains at least some access stratum context information may be supported. At least according to some embodiments, such a state may employ wireless device based mobility, e.g., such that a wireless device can move within a radio access network notification area (RNA) without notifying the next generation (NG) radio access network (RAN). While in this state, a wireless device may perform cell re-selection and system information acquisition for itself. At the same time, the last serving base station (e.g., gNB) may keep the wireless device context and the NG connection with the 5G core network (CN) associated with the wireless device, e.g., to facilitate easier transition back to a RRC connected state. When paging a wireless device in RRC inactive mode, RNA specific parameters may be used by the RAN, for example including a UE specific DRX and UE Identity Index value (e.g., I-RNTI).

A wireless device operating in such a RRC inactive mode may perform RNA updates periodically (e.g., based on a configured periodic RNA update timer) and/or when the wireless device moves out of its current configured RNA to a different RNA, according to some embodiments. FIG. 5 illustrates a possible signaling flow for an exemplary RNA update procedure. Note that while the signal flow illustrated in FIG. 5 represents one possible RNA update signaling flow, it should be noted that variations or alternative RNA update signaling flows are also possible, and that the signaling flow of FIG. 5 should not be considered limiting to the disclosure as a whole. As shown, a UE 502 may provide a RNA update request 512 to a gNB 504. The gNB 504 may provide a retrieve UE context request 514 to the last serving gNB 506 for the UE 502. The last serving gNB 506 may provide a retrieve UE context response 516 to the gNB 504, which may provide a RRCConnectionRelease/Resume message 518 to the UE 502. The gNB 504 may also provide a data forwarding address indication 520 to the last serving gNB 506, and may provide a path switch request 522 to an access and mobility management function (AMF) entity 508. The AMF entity 508 may provide a path switch request acknowledge message 524 to the gNB 504, and the gNB 504 may provide a UE context release message 526 to the last serving gNB 506.

Use of a RRC inactive state may help reduce the network signaling overhead for a wireless device's connection, at least in some instances. For example, for a wireless device with infrequent data transmissions, utilizing such a RRC inactive state may reduce the amount of mobility related signaling (e.g., for handovers) needed compared to a RRC connected state, e.g., since the wireless device may be able to manage it's own cell re-selection process when moving between cells. For such a wireless device, utilizing a RRC inactive state may also reduce the amount of connection setup related signaling needed compared to a RRC idle state, e.g., since the network may retain at least some context information for the wireless device. This may directly reduce the signaling latency associated with a transition to a RRC connected state.

As another potential benefit, such a state may reduce the control plane delay for a wireless device, e.g., in comparison to operating in a RRC idle state. For example, a reduced access stratum connection setup period and/or non-access stratum connection setup period may be possible for a RRC inactive state relative to a RRC idle state. The time to move from a battery efficient state to the start of continuous data transfer may thus be reduced.

Additionally, such a state may improve the power saving capability of a wireless device, e.g., in comparison to operating in a RRC connected state. For example, while in RRC connected mode, serving and/or neighboring cell measurements may be required more frequently than while in RRC inactive, e.g., at least in line with a connected mode discontinuous reception (C-DRX) period of the wireless device.

As noted previously herein, in the RRC inactive state, a wireless device may manage it's own cell re-selection process. This process may be performed in a similar manner as LTE (or other legacy cellular technologies like WCDMA/GSM) cell re-selection while in a RRC idle state, at least in some aspects, and/or may differ from such cell re-selection techniques in some aspects. The goal of the cell re-selection process may include keeping a wireless device camped on a suitable cell, which may include a cell with sufficient signal strength, signal quality, and/or other characteristics such that the wireless device may be able to establish/activate a connection and perform data transfer via the cell. Cell re-selection may include either or both of intra-frequency cell re-selection or inter-frequency cell re-selection.

For example, according to some embodiments, intra-frequency cell re-selection and/or equal priority inter-frequency cell re-selection may be triggered if serving cell quality drops below a configured threshold. In this case, a cell ranking criterion R may be evaluated for each candidate neighbor cell and for the serving cell, on the basis of which the wireless device may determine to re-select to a new serving cell or to remain camped on the current serving cell. The wireless device may also perform high priority inter-frequency cell re-selection, at least in some instances, e.g., if cell quality for a cell deployed on a high priority frequency has a cell quality greater than a configured threshold for a specified time duration (e.g., even if the serving cell quality remains above the configured threshold). Additionally, the wireless device may perform low priority inter-frequency cell re-selection, at least in some instances, e.g., if serving cell quality falls below a configured threshold, and if a cell deployed on a low priority frequency has a cell quality greater than a configured threshold. When evaluating the cell ranking criterion R, it may be possible to include frequency-offset and/or cell-offset values, e.g., to modify the R value for specific cells and/or for cells deployed on specific frequencies.

As further previously noted herein, at least according to some embodiments, a wireless device may be configured to perform a RNA update when it moves out of its current RNA. For example, if a wireless device re-selects to a cell in a different RNA, the wireless device may perform a RNA update procedure. Such a RNA update procedure may require a RRC state transition and signaling overhead to complete the RNA update procedure. Since the UE context may be unavailable in the target cell, a new RRC connection for the wireless device may need to be established from RRC idle mode. This may also delay data transmission while such a procedure is in process.

A device operating in the RRC inactive state and with high mobility may accordingly have to wake up at instances when the RNA changes, potentially just to perform, RNA updates even though the device might not have any requirement to perform actual user data transfer. Such frequent RNA updates may incur a significant power cost to the device.

Accordingly, it would be desirable to minimize unnecessary RNA update procedures, at least according to some embodiments. One possible technique for potentially reducing the number of unnecessary RNA update procedures performed by a wireless device may include preferentially re-selecting to cells within the current RNA of a wireless device when performing cell re-selection, e.g., from RRC inactive mode. FIG. 6 illustrates an exemplary possible scenario in which such a technique may be useful. For example, consider a wireless device that moves from cell-5 to cell-3. Cell-2 and cell-7 may be partially overlapped, such that when moving out of cell-5, the wireless device might re-select to cell-2 or cell-7. If the wireless device re-selects to cell-7, which is not in the same RNA that the wireless device is currently in, a RNA update procedure would be triggered, while if the wireless device re-selects to cell-2, which is in the same RNA that the wireless device is currently in, a RNA update procedure would not be triggered. Further, when eventually moving to cell-3, if the wireless device had re-selected to cell-7, the wireless device would have to perform a still further RNA update procedure, while if the wireless device had re-selected to cell-2, the wireless device would still remain in the same RNA and still not need to perform a RNA update procedure. Thus, in the exemplary scenario of FIG. 6, if the wireless device is able to prioritize cells that are in the current RNA of the wireless device when performing cell re-selection, it may be more likely for the wireless device to re-select to cell-2 than to cell-7, thereby avoiding multiple unnecessary RNA update procedures.

Accordingly, FIG. 7 is a flowchart diagram illustrating a method for a wireless device (e.g., a wireless user equipment (UE) device) to perform cell re-selection while in an inactive state in a cellular communication system, which may help reduce the number of unnecessary transitions between RNAs (and thus RNA update procedures) performed by the wireless device, at least according to some embodiments.

Aspects of the method of FIG. 7 may be implemented by a wireless device, e.g., in conjunction with a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 7 are described in a manner relating to the use of communication techniques and/or features associated with NR and/or 3GPP specification documents, such description is not intended to be limiting to the disclosure, and aspects of the method of FIG. 7 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 7 may operate as follows.

In 702, the wireless device may establish a RRC connection with a cellular base station. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. While in the RRC connected state, the wireless device may undergo handover from one serving cell (e.g., provided by a cellular base station) to another serving cell (e.g., provided by a different cellular base station), at least in some embodiments.

In 704, the wireless device may receive an indication deactivating the RRC connection, and/or may otherwise determine that a trigger has occurred to deactivate the RRC connection. Based at least in part on the indication (and/or other trigger), the wireless device may transition from the RRC connected state to a RRC inactive state. The indication may be received from a cellular base station (e.g., the base station with which the RRC connection was established, or possibly a different cellular base station if handover has occurred one or more times). The wireless device may be associated with a certain ("first" or "current") RNA when transitioning to the RRC inactive state, e.g., the RNA to which the cellular base station that provided the indication belongs. While in the RRC inactive state, the wireless device may be paged by the cells of the current RNA if the network has data for the wireless device based on the wireless device's association with the current RNA.

In 706, the wireless device may perform cell re-selection while in the RRC inactive state in a manner that prioritizes cells that are in the current RNA of the wireless device. As previously noted herein, prioritizing cells that are in the current RNA of the wireless device when performing cell re-selection may help reduce unnecessary RNA update procedures, which may be beneficial to both the wireless device and the cellular network, at least in some instances.

Prioritizing cells that are in the current RNA of the wireless device when performing cell re-selection may be accomplished in any of a variety of possible ways. As one possibility, cells associated with the current RNA and/or cells deployed on frequencies associated with the current RNA may be prioritized over cells that are not associated with the current RNA and/or cells that are deployed on frequencies that are not associated with the current RNA, e.g., when selecting candidate cells for re-selection. As another possibility, once candidate cells for re-selection are selected, cells associated with the current RNA and/or deployed on frequencies associated with the current RNA may be assigned higher ranking values than they would be if not associated with the current RNA and/or deployed on frequencies associated with the current RNA. As a still further possibility, after candidate cells for re-selection are selected and ranked and one or more suitable cells for re-selection have been identified, the wireless device may check whether any of the suitable cells is associated with the current RNA, and preferably re-select to a cell associated with the current RNA from among the suitable cells.

In a scenario in which selecting candidate cells for re-selection is based at least in part on the current RNA of the wireless device, the relative prioritization of frequencies associated with the current RNA and/or the relative prioritization of cells associated with the current RNA may be explicitly indicated by the network, or may be determined by the wireless device without specific configuration information from the network. For example, in an explicit configuration arrangement, the network may provide configuration information in system information blocks (SIBs) or dedicated signaling when triggering the wireless device to transition to RRC inactive, among various possibilities. The configuration information may indicate frequency and/or cell level priority that is common or different for each frequency/cell, as desired. If both frequency and cell level priority information is provided, the wireless device may first apply the frequency priority to selecting one or more frequencies from which to select candidate cells, then may apply the cell priority during candidate cell selection from the RNA cell list. In an arrangement without explicit configuration, the wireless device may consider all frequencies/cells indicated to be in the RNA as equally having a highest priority level during cell re-selection, at least as one possibility.

Note that in some instances, a cell list for the current RNA of the wireless device may not be provided to the wireless device (e.g., only a RNA ID may be provided). In this case, the wireless device may still apply frequency level handling, if desired, with or without explicit configuration of frequency level priority by the network. For example, the network may configure a frequency list of the RNA together with the RNA ID, which may indicate the frequency priorities, and the wireless device may apply the frequency priorities according to the frequency list during candidate cell selection. If the network does not configure frequency level priority, the wireless device may set the priority for frequencies in the frequency list as equally having a highest priority level during cell re-selection, at least as one possibility.

In such a scenario, as the wireless device may not be able to confirm from a RNA cell list that a cell that is deployed on a frequency associated with the current RNA is actually in the current RNA (e.g., consider cell-7 of FIG. 6, which is deployed on a frequency associated with the current RNA of the wireless device of FIG. 6, but is not in the current RNA of the wireless device of FIG. 6), the wireless device may check whether a cell chosen for re-selection is actually in the current RNA of the wireless device prior to re-selection to that cell, at least according to some embodiments. For example, the wireless device may acquire the system information of a cell to check whether it is in the current RNA of the wireless device, and may potentially instead choose a different cell to re-select to if the cell is not in the current RNA of the wireless device based on acquiring the system information of the cell.

In a scenario in which candidate cells ranking values are modified based at least in part on the current RNA of the wireless device, the relative prioritization of frequencies associated with the current RNA and/or the relative prioritization of cells associated with the current RNA also may be explicitly indicated by the network, or may be determined by the wireless device without specific configuration information from the network. For example, in an explicit configuration arrangement, the network may provide configuration information in system information blocks (SIBs) or dedicated signaling when triggering the wireless device to transition to RRC inactive, among various possibilities. The configuration information may indicate frequency offsets and/or cell offsets that could be common or different for each frequency/cell, as desired. The wireless device may apply the offset for the cell and/or frequency to a cell's ranking, e.g., as part of a R criterion value calculation. In an arrangement without explicit configuration, the wireless device may consider all frequencies/cells indicated to be in the RNA as equally having frequency/cell related offset of 0 (e.g., the highest priority) as part of the R criterion value calculation, at least as one possibility.

As previously noted herein, in some instances, a cell list for the current RNA of the wireless device may not be provided to the wireless device (e.g., only a RNA ID may be provided). In this case, the wireless device may still apply frequency level handling, if desired, with or without explicit configuration of frequency level priority by the network. For example, the network may configure a frequency list of the RNA together with the RNA ID, which may indicate the frequency offset(s), and the wireless device may apply the frequency offset(s) according to the frequency list during R value calculation for cells deployed on frequencies associated with the current RNA of the wireless device. If the network does not configure frequency level priority, the wireless device may set the frequency related offset for cells deployed on frequencies in the frequency list to 0 (e.g., the highest priority) as part of R value calculation, at least as one possibility.

In such a scenario, the wireless device may not apply special handling at the cell level in R value calculation. As the wireless device may not be able to confirm from a RNA cell list that a cell that is deployed on a frequency associated with the current RNA is actually in the current RNA, the wireless device may check whether a cell chosen for re-selection is actually in the current RNA of the wireless device prior to re-selection to that cell, at least according to some embodiments. For example, the wireless device may acquire the system information of a cell to check whether it is in the current RNA of the wireless device, and may potentially instead choose a different cell to re-select to if the cell is not in the current RNA of the wireless device based on acquiring the system information of the cell. Alternatively, if desired, the wireless device may still apply special handling at the cell level in R value calculation, e.g., by acquiring the system information of candidate cells to check whether each candidate cell is in the current RNA of the wireless device, then applying the cell related offset to each candidate cell based on whether it is in the current RNA of the wireless device during R value calculation.

To support such use of RNA based frequency and/or cell offset values for R value calculation, one or more terms may be added to and/or modified in a cell ranking equation that is used for calculating the R value for neighbor cells. For example, in the following equation, a factor "$Qoffset_{inactive}$" is included that can be used to input a delta value to the cell ranking for a cell with the same RNA ID as that of the serving cell, in order to prioritize this cell:

$$Rn = Qmeas,n - Qoffset_{inactive} - Qoffset_{temp} + Qoffset_{SCPTM}$$

In such a case, a base station (e.g., gNB) could configure different $Qoffset_{inactive}$ values for different cells (e.g., in view of the cell list for the RNA), if desired.

Note that alternatively, the same equation as used may be used for calculating the R value for a cell according to LTE cell re-selection techniques may be used, but the "Qoffset" term in such an equation could be configured to support inclusion of a delta value to the cell ranking for a cell with the same RNA ID as that of the serving cell, in order to prioritize this cell, e.g., as follows:

$$Rn = Qmeas,n - Qoffset - Qoffset_{temp} + Qoffset_{SCPTM}$$

As another possibility, a $Qoffset_{inactive}$ term may still be included in the equation for calculating the R value for neighbor cells when operating in RRC inactive mode, but may not be used to input a delta value to the cell ranking for a cell with the same RNA ID as that of the serving cell, in order to prioritize this cell. Instead, in this example, a further term "Qdelta" may be introduced for the cells with the same RNA as the serving cell, e.g., as follows:

$$Rn = Qmeas,n - Qoffset_{inactive} + Qdelta - Qoffset_{temp} + Qoffset_{SCPTM}$$

With this Qdelta, the priority of the cells in the same RNA can be made higher than other cells.

Note that in each of these examples, the exemplary equation that is used for calculating the R value for neighbor cells may be used in addition to the following cell ranking equation that may be used for calculating the R value for the serving cell, at least as one possibility:

$$Rs = Qmeas,s + Qhyst - Qoffset_{temp} + QOffset_{SCPTM}$$

Note that if frequency- and/or cell-level offsets or other cell re-selection related parameters based on RNA are used and are explicitly configured by the network, they may be indicated in any of various possible ways. As one possibility, base stations (e.g., gNBs) may provide such information in system information. As another possibility, dedicated RRC signaling could be used. For example, such information could be included in a RRCconnectionrelease message, as one possibility.

In a scenario in which no specific cell re-selection or cell ranking parameters are introduced based on RNA for RRC inactive operation, the wireless device may perform cell re-selection without consideration of whether a cell is in its current RNA through determining whether one or more cells fulfill the re-selection criteria (e.g., are suitable for re-selection). If the wireless device has identified multiple cells suitable for re-selection based on the re-selection criteria, and at least one of them is within the same RNA as the wireless device, then the wireless device may preferentially perform the cell re-selection to such a cell. The wireless device may determine whether the cells identified as being suitable for re-selection are within the same RNA as the wireless device by acquiring system information for such cells and thereby determining their RNA IDs, at least as one possibility.

Thus, a wireless device may be able to preferentially re-select to cells within the same RNA as the wireless device when in a RRC inactive state. As previously noted herein, such techniques may cause the wireless device to perform RNA updates less often than if no preference were given to cells within the same RNA as the wireless device when performing cell re-selection. This may in turn reduce the signaling load on the network, improve power efficiency and/or reduce data transmission delays for the wireless device, among other possible benefits.

In the following further exemplary embodiments are provided.

One set of embodiments may include an apparatus, comprising a processing element configured to cause a wireless device to: receive an indication deactivating a radio resource control (RRC) connection from a cellular base station, wherein the cellular base station is in a first radio access network notification area (RNA), wherein after receiving the indication deactivating the RRC connection, the wireless device operates in a RRC inactive state; and perform cell re-selection while in the RRC inactive state, wherein cells that are in the first RNA are prioritized over cells that are not in the first RNA when performing cell re-selection while in the RRC inactive state.

According to some embodiments, to perform cell re-selection while in the RRC inactive state, the processing element is further configured to cause the wireless device to: receive a RNA frequency list for the first RNA from the cellular base station; determine that one or more frequencies are associated with the first RNA based at least in part on the RNA frequency list for the first RNA; and prioritize cells deployed on the one or more frequencies associated with the first RNA when selecting candidate cells for cell re-selection.

According to some embodiments, the processing element is further configured to cause the wireless device to: receive priority information for the first RNA from the cellular base station indicating relative priority of the one or more frequencies associated with the first RNA, wherein the cells deployed on the one or more frequencies associated with the first RNA are prioritized by the wireless device when selecting candidate cells for cell re-selection in accordance with the priority information.

According to some embodiments, to perform cell re-selection while in the RRC inactive state, the processing element is further configured to cause the wireless device to: receive a RNA cell list for the first RNA from the cellular base station; determine that one or more cells are associated with the first RNA based at least in part on the RNA cell list for the first RNA; and prioritize the one or more cells associated with the first RNA when selecting candidate cells for cell re-selection.

According to some embodiments, the processing element is further configured to cause the wireless device to: receive priority information for the first RNA from the cellular base station indicating relative priority of the one or more cells associated with the first RNA, wherein the one or more cells associated with the first RNA are prioritized by the wireless device when selecting candidate cells for cell re-selection in accordance with the priority information.

According to some embodiments, to perform cell re-selection while in the RRC inactive state, the processing element is further configured to cause the wireless device to: rank a plurality of candidate cells for re-selection according to a rank value for each cell of the plurality of candidate cells for re-selection, wherein the rank value for a candidate cell is determined based at least in part on whether the candidate cell is associated with the first RNA.

According to some embodiments, the processing element is further configured to cause the wireless device to: receive rank offset information indicating by how much to modify the rank values of cells associated with the first RNA from the cellular base station.

According to some embodiments, to perform cell re-selection while in the RRC inactive state, the processing element is further configured to cause the wireless device to: rank a plurality of candidate cells for re-selection according to a rank value for each cell of the plurality of candidate cells for re-selection, wherein the rank value for a candidate cell is determined based at least in part on whether the candidate cell is deployed on a frequency associated with the first RNA.

According to some embodiments, the processing element is further configured to cause the wireless device to: receive rank offset information indicating by how much to modify the rank values of cells deployed on frequencies associated with the first RNA from the cellular base station.

According to some embodiments, to perform cell re-selection while in the RRC inactive state, the processing element is further configured to cause the wireless device to: rank a plurality of candidate cells for re-selection according to a rank value for each cell of the plurality of candidate cells for re-selection; determine that one or more of the candidate cells for re-selection are suitable for re-selection based at least in part on the rank values; determine that at least one candidate cell for re-selection that is determined to be suitable for re-selection is associated with the first RNA; and preferentially select a cell for re-selection from the at least one candidate cell for re-selection that is determined to be suitable for re-selection and that is associated with the first RNA over any candidate cells for re-selection that are determined to be suitable for re-selection and that are not associated with the first RNA.

Another set of embodiments may include a wireless device, comprising: at least one antenna; a radio operably coupled to the at least one antenna; and a processing element operably coupled to the radio; wherein the wireless device is configured to: perform cell re-selection while in a radio resource control (RRC) inactive state, wherein cells that are in a current radio access network notification area (RNA) of the wireless device are prioritized over cells that are not in the current RNA when performing cell re-selection while in the RRC inactive state.

According to some embodiments, to perform the cell re-selection while in the RRC inactive state, the wireless device is further configured to: select one or more candidate cells for the cell re-selection, wherein the one or more candidate cells are selected based at least in part on at least one of: whether a cell is associated with the current RNA of the wireless device; or whether a frequency on which a cell is deployed is associated with the current RNA of the wireless device.

According to some embodiments, the wireless device is further configured to: receive frequency and/or cell priority information for the current RNA; and prioritize the one or more candidate cells in accordance with the frequency and/or cell priority information.

According to some embodiments, to perform the cell re-selection while in the RRC inactive state, the wireless device is further configured to: rank a plurality of candidate cells for re-selection, wherein the ranking is based at least in part on one or more of: whether a cell is associated with the current RNA of the wireless device; or whether a frequency on which a cell is deployed is associated with the current RNA of the wireless device.

According to some embodiments, to perform the cell re-selection while in the RRC inactive state, the wireless device is further configured to: rank a plurality of candidate cells for re-selection; select a cell for re-selection based at least in part on ranking the plurality of candidate cells for re-selection; determine whether the selected cell is associated with the current RNA of the wireless device; and determine whether to re-select to the selected cell based at least in part on whether the selected cell is associated with the current RNA of the wireless device.

Yet another set of embodiments may include a method, comprising: by a wireless device: establishing a radio resource control (RRC) connection with a cellular base station; receiving an indication to enter a RRC inactive state from the cellular base station; and selecting a cell for cell re-selection for the wireless device while in the RRC inactive state based at least in part on whether the selected cell is in a current radio access network notification area (RNA) of the wireless device.

According to some embodiments, the method further comprises: selecting one or more candidate cells for the cell re-selection, wherein the one or more candidate cells are selected based at least in part on at least one of: whether a cell is associated with the current RNA of the wireless device; or whether a frequency on which a cell is deployed is associated with the current RNA of the wireless device.

According to some embodiments, the method further comprises: ranking a plurality of candidate cells for re-selection, wherein the ranking is based at least in part on one or more of: whether a cell is associated with the current RNA of the wireless device; or whether a frequency on which a cell is deployed is associated with the current RNA of the wireless device.

According to some embodiments, the method further comprises: receiving frequency and/or cell priority information for the current RNA of the wireless device from the cellular base station, wherein the frequency and/or cell priority information for the current RNA indicates offset values with which to modify ranking values of candidate cells for re-selection that are deployed on a frequency associated with the current RNA and/or that are associated with the current RNA, wherein the ranking is further based at least in part on the frequency and/or cell priority information.

According to some embodiments, the method further comprises: ranking a plurality of candidate cells for re-selection; selecting a cell for re-selection based at least in part on ranking the plurality of candidate cells for re-selection; determining whether the selected cell is associated with the current RNA of the wireless device; and determining whether to re-select to the selected cell based at least in part on whether the selected cell is associated with the current RNA of the wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising a processing element configured to cause a wireless device to:
perform cell re-selection while in a radio resource control (RRC) inactive state, wherein cells that are in a first radio access network notification area (RNA) are prioritized over cells that are not in the first RNA when performing cell re-selection while in the RRC inactive state, wherein to perform cell re-selection while in the RRC inactive state, the processing element is further configured to cause the wireless device to:
receive a RNA frequency list for the first RNA from a cellular base station;
determine that one or more frequencies are associated with the first RNA based at least in part on the RNA frequency list for the first RNA; and
prioritize cells deployed on the one or more frequencies associated with the first RNA when selecting candidate cells for cell re-selection.

2. The apparatus of claim 1, wherein the processing element is further configured to cause the wireless device to:
receive priority information for the first RNA from the cellular base station indicating relative priority of the one or more frequencies associated with the first RNA,
wherein the cells deployed on the one or more frequencies associated with the first RNA are prioritized by the wireless device when selecting candidate cells for cell re-selection in accordance with the priority information.

3. The apparatus of claim 1, wherein to perform cell re-selection while in the RRC inactive state, the processing element is further configured to cause the wireless device to:
receive an RNA cell list for the first RNA from a cellular base station;
determine that one or more cells are associated with the first RNA based at least in part on the RNA cell list for the first RNA; and
prioritize the one or more cells associated with the first RNA when selecting candidate cells for cell re-selection.

4. The apparatus of claim 3, wherein the processing element is further configured to cause the wireless device to:
receive priority information for the first RNA from the cellular base station indicating relative priority of the one or more cells associated with the first RNA,
wherein the one or more cells associated with the first RNA are prioritized by the wireless device when selecting candidate cells for cell re-selection in accordance with the priority information.

5. The apparatus of claim 1, wherein to perform cell re-selection while in the RRC inactive state, the processing element is further configured to cause the wireless device to:
rank a plurality of candidate cells for re-selection according to a rank value for each cell of the plurality of candidate cells for re-selection, wherein the rank value for a candidate cell is determined based at least in part on whether the candidate cell is associated with the first RNA.

6. The apparatus of claim 5, wherein the processing element is further configured to cause the wireless device to:
receive rank offset information indicating by how much to modify the rank values of cells associated with the first RNA from a cellular base station.

7. The apparatus of claim 1, wherein to perform cell re-selection while in the RRC inactive state, the processing element is further configured to cause the wireless device to:

rank a plurality of candidate cells for re-selection according to a rank value for each cell of the plurality of candidate cells for re-selection, wherein the rank value for a candidate cell is determined based at least in part on whether the candidate cell is deployed on a frequency associated with the first RNA.

8. The apparatus of claim 7, wherein the frequency list indicates rank offset information indicating by how much to modify the rank values of cells deployed on frequencies associated with the first RNA from a cellular base station.

9. The apparatus of claim 1, wherein to perform cell re-selection while in the RRC inactive state, the processing element is further configured to cause the wireless device to:
rank a plurality of candidate cells for re-selection according to a rank value for each cell of the plurality of candidate cells for re-selection;
determine that one or more of the candidate cells for re-selection are suitable for re-selection based at least in part on the rank values;
determine that at least one candidate cell for re-selection that is determined to be suitable for re-selection is associated with the first RNA; and
preferentially select a cell for re-selection from the at least one candidate cell for re-selection that is determined to be suitable for re-selection and that is associated with the first RNA over any candidate cells for re-selection that are determined to be suitable for re-selection and that are not associated with the first RNA.

10. A wireless device, comprising:
at least one antenna;
a radio operably coupled to the at least one antenna; and
a processing element operably coupled to the radio;
wherein the wireless device is configured to:
perform cell re-selection while in a radio resource control (RRC) inactive state, wherein cells that are in a current radio access network notification area (RNA) of the wireless device are prioritized over cells that are not in the current RNA when performing cell re-selection while in the RRC inactive state, wherein to perform cell re-selection while in the RRC inactive state, the wireless device is further configured to:
receive an RNA frequency list for the current RNA from a cellular base station;
determine that one or more frequencies are associated with the current RNA based at least in part on the RNA frequency list for the current RNA; and
prioritize cells deployed on the one or more frequencies associated with the current RNA when selecting candidate cells for cell re-selection.

11. The wireless device of claim 10, wherein to perform the cell re-selection while in the RRC inactive state, the wireless device is further configured to:
select one or more candidate cells for the cell re-selection, wherein the one or more candidate cells are selected based at least in part on at least one of:
whether a cell is associated with the current RNA of the wireless device; or
whether a frequency on which a cell is deployed is associated with the current RNA of the wireless device.

12. The wireless device of claim 11, wherein the wireless device is further configured to:
receive frequency and/or cell priority information for the current RNA; and
prioritize the one or more candidate cells in accordance with the frequency and/or cell priority information.

13. The wireless device of claim 10, wherein to perform the cell re-selection while in the RRC inactive state, the wireless device is further configured to:
rank a plurality of candidate cells for re-selection, wherein the ranking is based at least in part on one or more of:
whether a cell is associated with the current RNA of the wireless device; or
whether a frequency on which a cell is deployed is associated with the current RNA of the wireless device.

14. The wireless device of claim 10, wherein to perform the cell re-selection while in the RRC inactive state, the wireless device is further configured to:
rank a plurality of candidate cells for re-selection;
select a cell for re-selection based at least in part on ranking the plurality of candidate cells for re-selection;
determine whether the selected cell is associated with the current RNA of the wireless device; and
determine whether to re-select to the selected cell based at least in part on whether the selected cell is associated with the current RNA of the wireless device.

15. The wireless device of claim 10, wherein the wireless device is further configured to:
receive rank offset information indicating by how much to modify the rank values of cells associated with the first RNA from a cellular base station.

16. A method, comprising:
by a wireless device:
establishing a radio resource control (RRC) connection with a cellular base station;
receiving an indication to enter a RRC inactive state from the cellular base station; and
selecting a cell for cell re-selection for the wireless device while in the RRC inactive state based at least in part on whether the selected cell is in a current radio access network notification area (RNA) of the wireless device, wherein selecting a cell for re-selection for the wireless device while in the RRC inactive state comprises:
receiving an RNA frequency list for the current RNA from a cellular base station;
determining that one or more frequencies are associated with the current RNA based at least in part on the RNA frequency list for the current RNA; and
prioritizing cells deployed on the one or more frequencies associated with the current RNA when selecting candidate cells for cell re-selection.

17. The method of claim 16, the method further comprising:
selecting a cell re-selection priority level for the one or more frequencies associated with the current RNA of the wireless device based at least in part on the one or more frequencies being associated with the current RNA of the wireless device; and
selecting a cell re-selection priority level for one or more cells associated with the current RNA of the wireless device based at least in part on the one or more cells being associated with the current RNA of the wireless device.

18. The method of claim 16, the method further comprising:
ranking a plurality of candidate cells for re-selection, wherein the ranking is based at least in part on one or more of:
whether a cell is associated with the current RNA of the wireless device; or
whether a frequency on which a cell is deployed is associated with the current RNA of the wireless device.

19. The method of claim 18, the method further comprising:
   receiving frequency and/or cell priority information for the current RNA of the wireless device from the cellular base station, wherein the frequency and/or cell priority information for the current RNA indicates offset values with which to modify ranking values of candidate cells for re-selection that are deployed on a frequency associated with the current RNA and/or that are associated with the current RNA,
   wherein the ranking is further based at least in part on the frequency and/or cell priority information.

20. The method of claim 16, the method further comprising:
   ranking a plurality of candidate cells for re-selection;
   selecting a cell for re-selection based at least in part on ranking the plurality of candidate cells for re-selection;
   determining whether the selected cell is associated with the current RNA of the wireless device; and
   determining whether to re-select to the selected cell based at least in part on whether the selected cell is associated with the current RNA of the wireless device.

* * * * *